(12) United States Patent
Zhang et al.

(10) Patent No.: US 9,304,145 B2
(45) Date of Patent: Apr. 5, 2016

(54) INSPECTION METHOD AND ITS APPARATUS FOR THERMAL ASSIST TYPE MAGNETIC HEAD ELEMENT

(71) Applicant: HITACHI HIGH-TECH FINE SYSTEMS CORPORATION, Kodama-gun, Saitama (JP)

(72) Inventors: Kaifeng Zhang, Tokyo (JP); Takenori Hirose, Tokyo (JP); Masahiro Watanabe, Tokyo (JP); Toshinori Sugiyama, Kamisato (JP); Akira Tobita, Kamisato (JP)

(73) Assignee: Hitachi High-Tech Fine Systems Corporation, Saitama (JP)

( * ) Notice: Subject to any disclaimer, the term of this patent is extended or adjusted under 35 U.S.C. 154(b) by 0 days.

(21) Appl. No.: 14/813,306

(22) Filed: Jul. 30, 2015

(65) Prior Publication Data

US 2016/0033548 A1   Feb. 4, 2016

(30) Foreign Application Priority Data

Jul. 30, 2014 (JP) .................................. 2014-154871

(51) Int. Cl.
*G01Q 20/02* (2010.01)
(52) U.S. Cl.
CPC ....................................... *G01Q 20/02* (2013.01)
(58) Field of Classification Search
USPC .................................... 850/24, 25, 30, 49, 50
See application file for complete search history.

(56) References Cited

U.S. PATENT DOCUMENTS

| 2010/0061002 | A1 | 3/2010 | Nakagomi et al. |
| 2010/0195239 | A1 | 8/2010 | Takayama et al. |
| 2011/0122735 | A1 | 5/2011 | Kato et al. |
| 2013/0063139 | A1* | 3/2013 | Tokutomi ............... B82Y 35/00 324/212 |
| 2014/0092716 | A1* | 4/2014 | Saito ...................... B82Y 35/00 369/53.38 |
| 2014/0092717 | A1* | 4/2014 | Tokutomi ............... G11B 5/455 369/53.38 |
| 2014/0096293 | A1* | 4/2014 | Kitano ................... B82Y 35/00 850/32 |

FOREIGN PATENT DOCUMENTS

| JP | 2009-230845 A | 10/2009 |
| JP | 2010-182394 A | 8/2010 |
| JP | 2011-86362 A | 4/2011 |
| JP | 2011-113595 A | 6/2011 |

OTHER PUBLICATIONS

Hillenbrand, R., et al., "Complex Optical Constants on a Subwavelength Scale", Physical Review Letters, vol. 85, No. 14, pp. 3029-3032, Oct. 2, 2000.

\* cited by examiner

*Primary Examiner* — Kiet T Nguyen
(74) *Attorney, Agent, or Firm* — Miles & Stockbridge P.C.

(57) ABSTRACT

To detect near-field light, which is generated by a thermal assist type magnetic head element, and leaking light with high sensitivity and to more accurately obtain the spatial intensity distribution of a near-field light generation area, an inspection apparatus for a thermal assist type magnetic head element is adapted so that a distance between a cantilever and the surface of a specimen and the excitation amplitude of the cantilever are set to be small to detect near-field light with high sensitivity by the suppression of an influence of other light components, a distance between the cantilever and the surface of the specimen and the excitation amplitude of the cantilever are set to be large to detect other light components present in the vicinity of near-field light with high sensitivity by the suppression of an influence of the amount of detected near-field light when other light components are measured.

16 Claims, 13 Drawing Sheets

F I G. 1
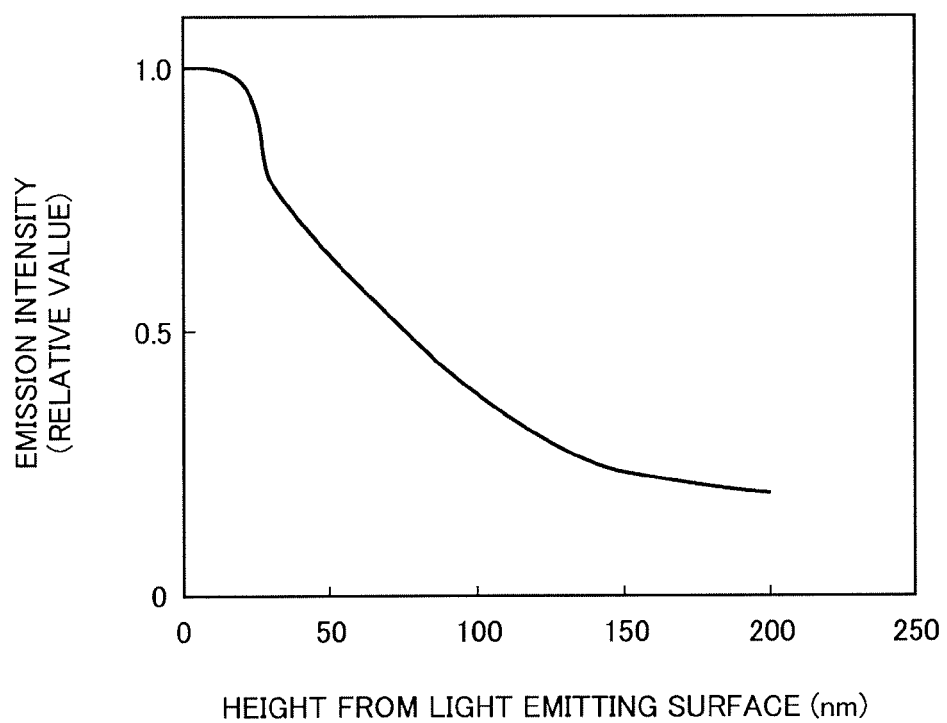

F I G. 2A
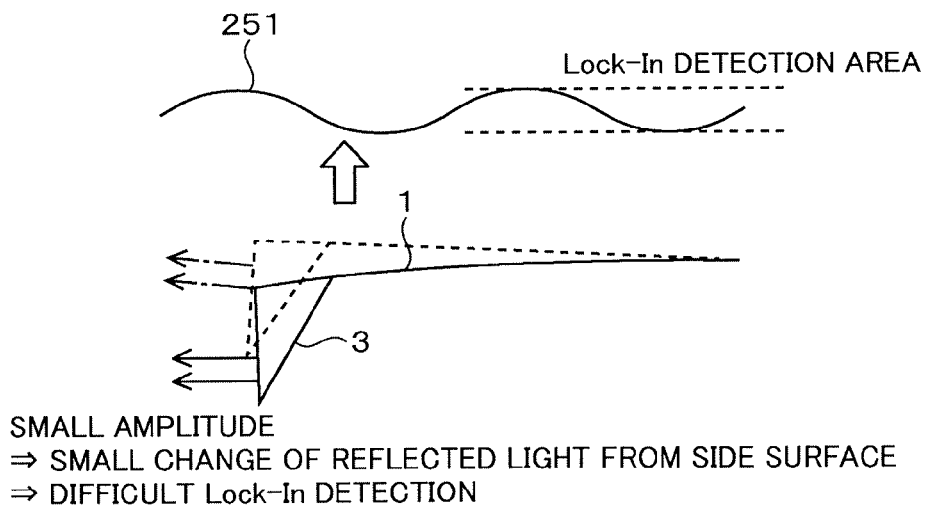
SMALL AMPLITUDE
⇒ SMALL CHANGE OF REFLECTED LIGHT FROM SIDE SURFACE
⇒ DIFFICULT Lock-In DETECTION
F I G. 2B
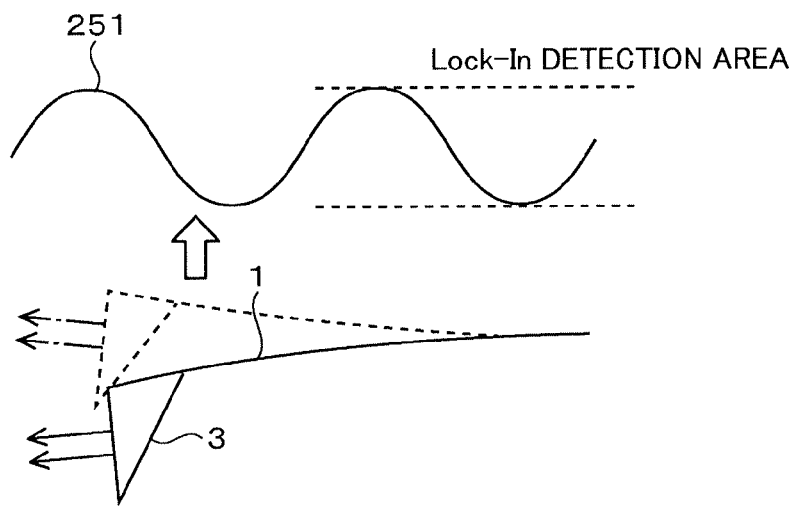
LARGE AMPLITUDE
⇒ LARGE CHANGE OF REFLECTED LIGHT FROM SIDE SURFACE
⇒ EASY Lock-In DETECTION F I G. 3 A
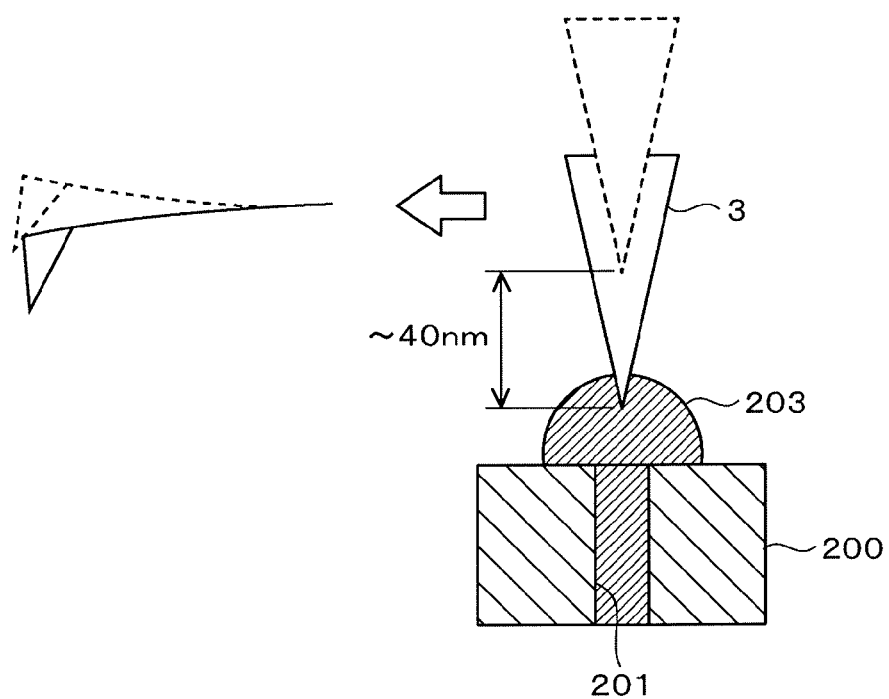

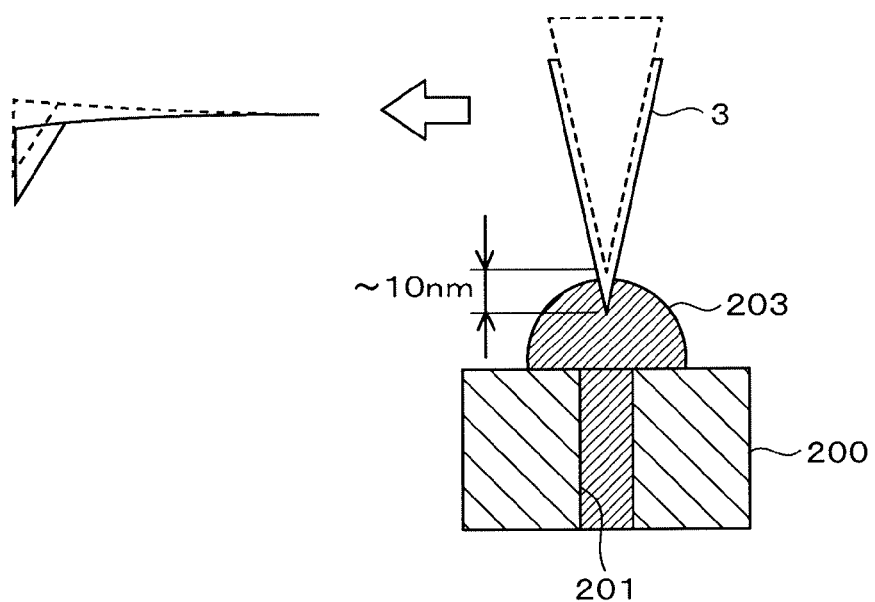
F I G. 3 B

F I G. 1 0 A
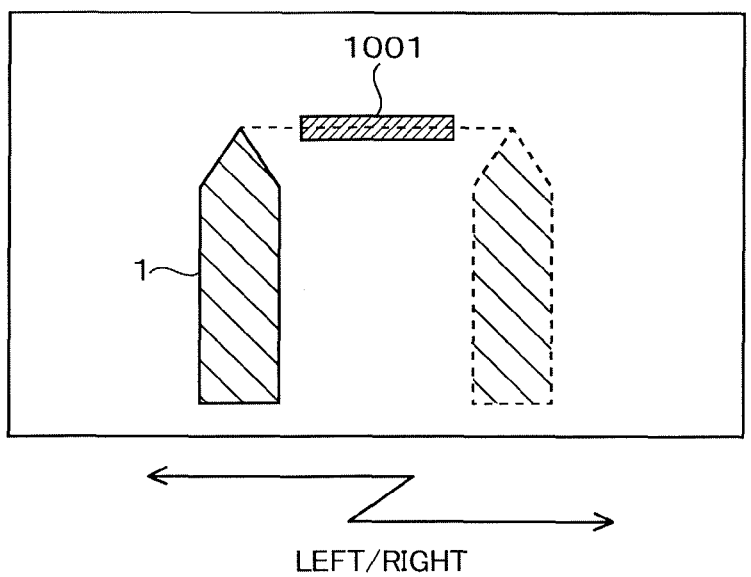
LEFT/RIGHT

F I G. 1 0 B
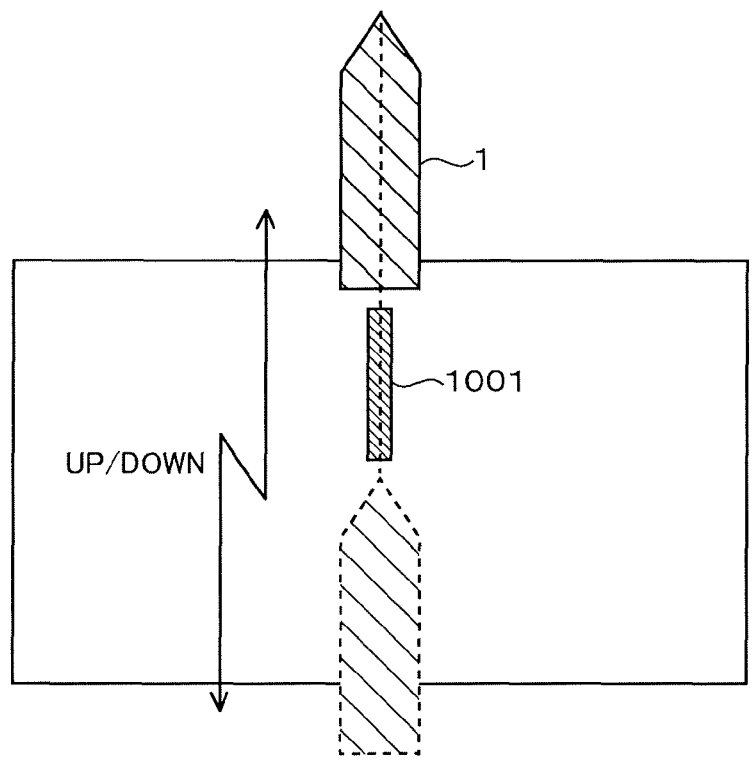

INSPECTION METHOD AND ITS APPARATUS FOR THERMAL ASSIST TYPE MAGNETIC HEAD ELEMENT

BACKGROUND

The present invention relates to an inspection method and an inspection apparatus for a thermal assist type magnetic head element that inspect a thermal assist type light emitting portion and a magnetic field generating portion of a thermal assist type magnetic head element by measuring a minute heat source with a scanning probe microscope.

Thermal assist type magnetic head elements, such as magnetic heads disclosed in JP 2010-182394 A (Patent Document 1), JP 2011-86362 A (Patent Document 2), and JP 2011-113595 A (Patent Document 3), have been examined as a magnetic head for a next-generation hard disk. Thermal assist light generated from a thermal assist type magnetic head element, that is, near-field light is in a width range of several tens or less nanometers (nm), and the spatial distribution of light spots, and the energy density or the absolute temperature as a heat source determine the writing track width of a hard disk. When the thermal assist type magnetic head element operates actually, an inspection method for information about the spatial intensity distribution of near-field light spots and the like is an important unsolved problem.

Meanwhile, techniques for measuring minute light-emitting areas, such as near-field light spots of a thermal assist type magnetic head element, on the basis of a scanning probe microscope (SPM) inspection technique are disclosed in JP 2009-230845 A (Patent Document 4) and Phys. Rev. Lett. 85, 3029 (Non-Patent Document 1).

SUMMARY

Patent Documents 1 to 3 disclose the structure of a thermal assist type magnetic head element but do not disclose a method of inspecting a thermal assist type magnetic head element.

Meanwhile, since near-field light and other light components, such as excitation light for near-field light, present in the vicinity of near-field light are detected under the same condition in a method disclosed in Patent Document 4 relating to the inspection of minute light-emitting areas, such as near-field light spots of a thermal assist type magnetic head element, near-field light and other light component cannot be separated from each other and cannot be individually measured.

Non-Patent Document 1 discloses a technique for distinguishing and detecting near-field light and other light components by using a technique for detecting harmonics, but there is a problem in that the detection sensitivity of second order harmonics or higher order harmonics than the second order harmonics significantly deteriorates. Further, Non-Patent Document 1 does not disclose a relationship between the state of the vibration of a cantilever and detection sensitivity when a probe microscope technique is used to detect harmonics.

The invention provides a technique capable of measuring both near-field light and light components, such as excitation light for near-field light, present in the vicinity of near-field light, which has not been provided in the related art, and solves a problem of low detection sensitivity of near-field light in the related art. Further, the invention provides an inspection method and an inspection apparatus for a thermal assist type magnetic head element that can more accurately obtain spatial intensity distribution of a near-field light generation area by detecting near-field light and light components, such as excitation light for near-field light, present in the vicinity of near-field light, with high sensitivity on the basis of the evaluation result of a relationship between the state of the vibration of a cantilever and detection sensitivity when a probe microscope technique is used.

In order to solve the above-mentioned problem, according to an aspect of the invention, there is provided an inspection apparatus for a thermal assist type magnetic head element including: a table unit on which a thermal assist type magnetic head element, which is a specimen, including a magnetic field generating portion and a near-field light emitting portion is placed and which is movable in a plane; a cantilever that includes a probe including a magnetic film and a noble metal film on a surface thereof and scans the surface of the specimen placed on the table unit; a probe height adjusting unit that adjusts a distance between the probe of the cantilever and the surface of the specimen; a vibration driving unit that vibrates the cantilever with a predetermined period and a predetermined amplitude in a vertical direction relative to the surface of the specimen; a signal output unit that outputs a signal generating a magnetic field from the magnetic field generating portion of the thermal assist type magnetic head element and a signal for generating near-field light from the near-field light emitting portion; a displacement detecting unit that detects the vibration of the cantilever by irradiating the surface of the cantilever opposite to the surface of the cantilever, on which the probe is formed, with light and detecting light reflected from the cantilever when the thermal assist type magnetic head element is moved in a plane by the table unit while a magnetic field is generated from the magnetic field generating portion of the thermal assist type magnetic head element by the signal output from the signal output unit and the cantilever is vibrated by the vibration driving unit; a scattered light detecting unit that detects scattered light generated from the surface of the probe of the cantilever by near-field light, which is generated from the near-field light emitting portion of the thermal assist type magnetic head element by the signal output from the signal output unit, and leaking light; and a controller that includes a lock-in amplifier to which a frequency signal allowing the vibration driving unit to vibrate the cantilever with a predetermined period or a signal of an integer multiple of the frequency signal is input as a reference signal and which extracts a scattered light component of the near-field light and a scattered light component of the leaking light from a detection signal obtained when the scattered light is detected by the scattered light detecting unit and a signal processing unit obtaining a generation area of the near-field light of the thermal assist type magnetic head element from the scattered light component of the near-field light and the scattered light component of the leaking light extracted by the lock-in amplifier, and controls the table unit, the probe height adjusting unit, the vibration driving unit, the signal output unit, the displacement detecting unit, and scattered light detecting unit.

Further, in order to solve the above-mentioned problem, according to another aspect of the invention, there is provided an inspection method for a thermal assist type magnetic head element including: obtaining a writing magnetic field generation area of a thermal assist type magnetic head element by moving a table unit in a plane and detecting the vibration of a cantilever, which includes a probe including a magnetic film and a noble metal film on a surface thereof, while the thermal assist type magnetic head element, which is a specimen, including a magnetic field generating portion and a near-field light emitting portion is placed on the table unit and a writing magnetic field is generated from the magnetic field generating portion of the thermal assist type magnetic head element; setting a height of the probe of the cantilever from the near-field light emitting portion and a vibration amplitude of the probe to conditions that are required to measure near-field light generated from the near-field light emitting portion while near-field light is generated from the near-field light emitting portion of the thermal assist type magnetic head element, and detecting reflected and scattered light generated from the probe by scanning an area, which includes an area generating the near-field light, by the probe; inputting a detection signal, which is obtained when the scattered light generated from the probe is detected, to a lock-in amplifier to which a frequency signal allowing the probe to be vibrated with a predetermined period or a signal of an integer multiple of the frequency signal is input as a reference signal, and extracting a scattered light component of the near-field light and a scattered light component of leaking light from the detection signal, which is obtained when the scattered light is detected; setting the height of the probe of the cantilever from the near-field light emitting portion and the vibration amplitude of the probe to conditions that are required to measure an area higher than an area from which the near-field light is generated while near-field light is generated from the near-field light emitting portion of the thermal assist type magnetic head element, and detecting reflected and scattered light generated from the probe by scanning the area, which is higher than the area from which the near-field light is generated, by the probe; inputting a signal, which is obtained when the reflected and scattered light generated from the probe is detected, to a lock-in amplifier to which a frequency signal allowing the probe to be vibrated with a predetermined period or a signal of an integer multiple of the frequency signal is input as a reference signal, and extracting a scattered light component of leaking light of the area, which is higher than the area from which the near-field light is generated, from the detection signal that is obtained when the scattered light is detected; and obtaining a generation area of near-field light of the thermal assist type magnetic head element from information about the scattered light component of the near-field light of the area, from which the extracted near-field light is generated, and a scattered light component of leaking light and information about the scattered light component of leaking light of the area that is higher than the area from which the near-field light is generated.

According to the aspects of the invention, it is possible to measure both near-field light generated by the thermal assist type magnetic head element and light components, such as excitation light for near-field light, present in the vicinity of near-field light, with high sensitivity. Accordingly, it is possible to more accurately obtain a generation area of near-field light.

Further, according to the aspects of the invention, it is possible to inspect a writing magnetic field generated by a thermal assist type magnetic head element in a manufacturing process as early as possible, the intensity distribution of thermal assist light (near-field light), the spatial distribution of excitation light for near-field light, the surface shapes of a magnetic field generating portion and a near-field light emitting portion, a positional relationship between a near-field light emitting portion and a writing magnetic field generating portion, the irradiation position of excitation light for near-field light, and the like in a nondestructive manner.

These features and advantages of the invention will be apparent from the following more particular description of preferred embodiments of the invention, as illustrated in the accompanying drawings.

BRIEF DESCRIPTION OF THE DRAWINGS

FIG. 1 is a graph illustrating the intensity distribution of near-field light, which is generated from a thermal assist type magnetic head element according to the invention, in a direction perpendicular to a light emitting surface.

FIG. 2A is a diagram illustrating a relationship of the amount of propagation light that is detected when the excitation amplitude of a cantilever is small.

FIG. 2B is a diagram illustrating a relationship of the amount of propagation light that is detected when the excitation amplitude of the cantilever is large.

FIG. 3A is a diagram illustrating a relationship between a near-field light generation area and the excitation amplitude of the cantilever, and is a front view of a near-field light emitting portion and a probe that is formed at an end of the cantilever when the excitation amplitude of the cantilever is large.

FIG. 3B is a diagram illustrating a relationship between the near-field light generation area and the excitation amplitude of the cantilever, and is a front view of the near-field light emitting portion and the probe that is formed at an end of the cantilever when the excitation amplitude of the cantilever is small.

FIG. 10A is a plan view illustrating that a cantilever according to a third example of the invention can repeatedly scan the same measurement area in a horizontal direction.

FIG. 10B is a plan view illustrating that the cantilever according to the third example of the invention can repeatedly scan the same measurement area in a vertical direction.

DESCRIPTION OF THE PREFERRED EMBODIMENTS

Figure 4A:
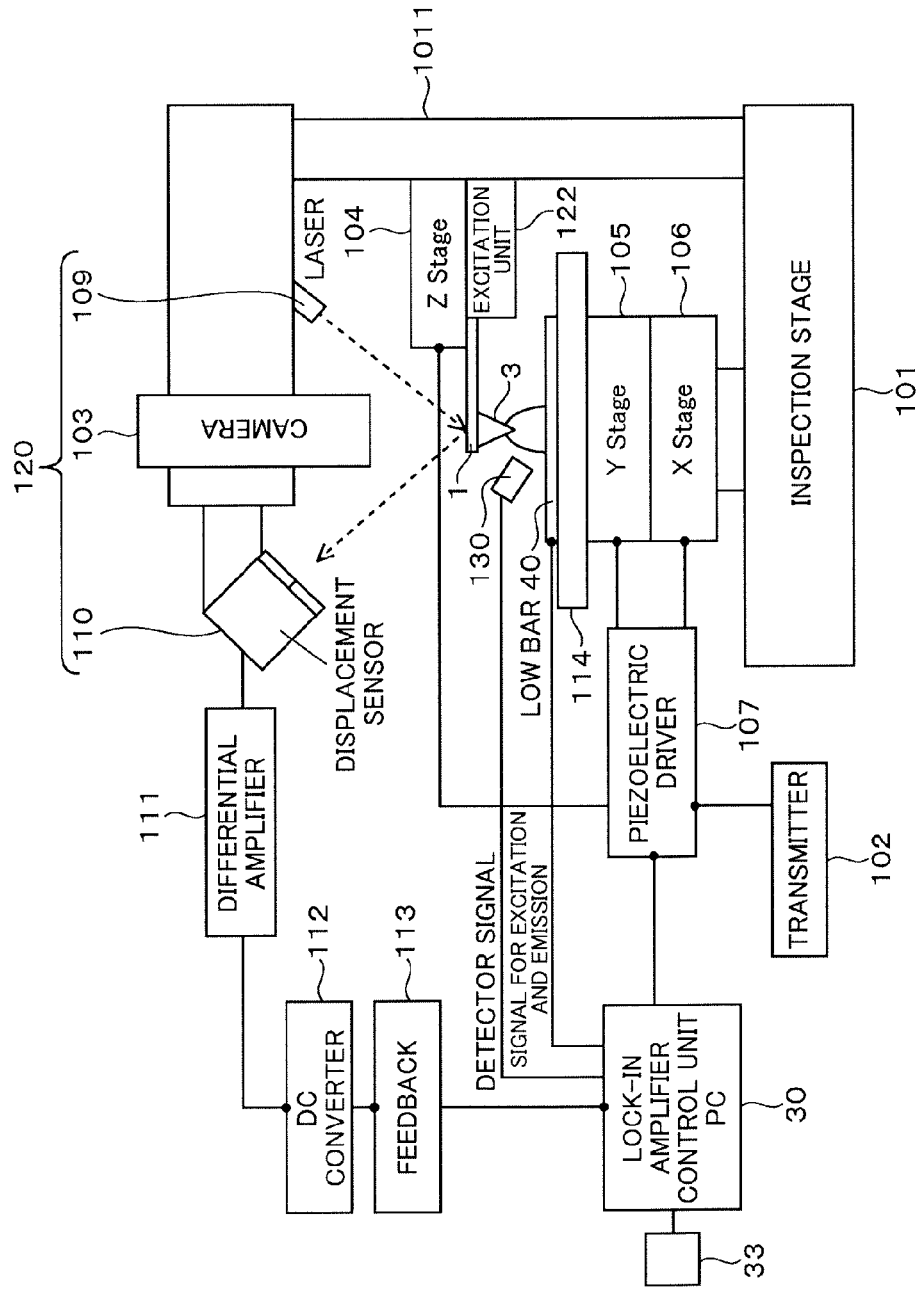
FIG. 4A is a block diagram illustrating the schematic configuration of an inspection apparatus for a thermal assist type magnetic head element according to a first example of the invention.

According to the aspect of the invention, the inspection apparatus for a thermal assist type magnetic head element measures both near-field light and light components, such as excitation light, which are present in the vicinity of near-field light and generated due to excitation caused by near-field light, with high sensitivity and inspects a thermal assist type magnetic head element by using means for changing a distance between the cantilever and the surface of the specimen and means for changing the vibration amplitude of the cantilever in the vertical direction relative to the surface of the specimen.

That is, in the aspect of the invention, first, an area of the surface of the specimen, which includes a near-field light generation area, is repeatedly scanned by a cantilever in which a magnetic film and a noble metal film are added to a tip of a probe, while a distance between the tip of the probe and the surface of the specimen is changed. As a result, the spatial distribution of near-field light in a direction perpendicular to the surface of the specimen is measured.

Next, when near-field light generated by a thermal assist type magnetic head element is measured using the cantilever, a distance between the cantilever and the surface of the specimen and the excitation amplitude of the cantilever are set to be small with reference to the spatial distribution of near-field light in a direction perpendicular to the surface of the specimen, which has been measured above, to detect only near-field light with high sensitivity by the suppression of an influence of other light components. When light components other than the near-field light, such as leaking light of excitation light for near-field light present in the vicinity of the near-field light generated by the thermal assist type magnetic head element, are measured, a distance between the cantilever and the surface of the specimen and the excitation amplitude of the cantilever are set to be large with reference to the spatial distribution of near-field light in a direction perpendicular to the surface of the specimen so that near-field light is not detected. As a result, light components other than near-field light, which are present in the vicinity of the near-field light, are detected with high sensitivity.

An embodiment of the invention will be described below in detail with reference to the drawings. Meanwhile, the same members are denoted in principle by the same reference numerals in all drawings illustrating the embodiment, and repeated description thereof will be omitted. The invention is not limited to examples to be described below and the drawings as long as not departing from the scope thereof.

First Example

First, the principle of the invention will be described below with reference to FIGS. 1, 2 and 3.

As a preliminary experiment of the invention, the light emitting surface of a thermal assist type magnetic head element, which is a specimen, and the vicinity thereof were repeatedly scanned by a probe of a cantilever while a distance between the probe and the light emitting surface of the thermal assist type magnetic head element was changed. As a result, the intensity distribution of near-field light, which was generated from the thermal assist type magnetic head element, on the light emitting surface and in a direction perpendicular to the light emitting surface was measured.

Results of the measurement are illustrated in FIG. 1. From the results illustrated in FIG. 1, it was confirmed that the amount of near-field light rapidly decreased when the probe was distant from the light emitting surface of the thermal assist type magnetic head element by a distance of 20 nm or more and near-field light could not be detected when the probe was distant from the light emitting surface of the thermal assist type magnetic head element by a distance of 150 nm or more.

The invention is to inspect near-field light, which is generated from a thermal assist type magnetic head element, and a light component (hereinafter, referred to as leaking light), which is different from the near-field light like leaking light of near-field light excitation light generated in the vicinity of the near-field light, by a scanning probe microscope (SPM). In the scanning probe microscope, a cantilever is vibrated to vibrate a probe, which is formed at an end portion of the cantilever, up and down in the vicinity of a near-field light generation area that is formed on the surface of the thermal assist type magnetic head element.

When the probe is vibrated as described above, a detector detects a scattered light component that is generated from the probe when the probe enters the near-field light generation area and a scattered light component that is generated from the probe by leaking light when the probe gets out of the near-field light generation area. For the detection of these scattered light components with a high signal/noise ratio by the detector, detected optical signals were filtered by a lock-in amplifier to which an excitation frequency signal of the cantilever or a signal of an integer multiple of an excitation frequency is input as a reference signal.

Among detection signals that are obtained when the detector detects scattered light from the probe, a component of propagation light is a component, which depends on the vibration of the cantilever, of light reflected and scattered from the probe. A relationship between the magnitude of an excitation amplitude of the cantilever and the amount of detected propagation light is illustrated in FIGS. 2A and 2B. That is, in FIG. 2A, the vibration amplitude of a cantilever 1 is small, the change of a detection signal 251, which is obtained when reflected light (scattered light) generated from a probe 3 is detected by a detector (not illustrated), is small, and the amount of reflected light, which can be detected using a lock-in amplifier, is also relatively small.

On the contrary, in FIG. 2B, the vibration amplitude of the cantilever 1 is large, the change of a detection signal 252, which is obtained when reflected light (scattered light) generated from the probe 3 is detected by a detector (not illustrated), is large, and the amount of reflected light, which can be detected using a lock-in amplifier, is relatively large.

Further, as confirmed by the experiment illustrated in FIG. 1, near-field light generated from the thermal assist type magnetic head element is intensely present up to a position that is distant from the light emitting surface by a distance of 20 nm, and the intensity of the near-field light rapidly decreases from a position that is distant from the light emitting surface by a distance of 20 nm or more. The reason for this is considered as follows: since the probe 3 comes into contact with a near-field light emitting area 203 only when the probe 3 is present on the lower side during the vibration of the probe 3 corresponding to one period if the vibration amplitude of the probe 3 is relatively large as illustrated in FIG. 3A, the amount of a detection signal of near-field light detected by the detector is small. In contrast, since contact time between the probe 3 and the near-field light emitting area 203 is increased if the vibration amplitude of the probe 3 is reduced as illustrated in FIG. 3B, the amount of a detection signal of near-field light detected by the detector (not illustrated) is increased. As a result, it is considered that the measuring sensitivity of the near-field light emitting area 203 can be also improved.

For this reason, when a distance between the probe 3 formed at an end portion of the cantilever 1 and the surface of a specimen 200 is set to 10 nm or less and the excitation amplitude of the cantilever 1 is set to be small (10 nm or less) at the time of the measurement of near-field light generated from the thermal assist type magnetic head element, it is possible to detect near-field light with high sensitivity by suppressing an influence of a light component different from the near-field light. Further, when a distance between the cantilever and the surface of the specimen is set to 20 nm or more in principle at the time of the measurement of leaking light generated from the thermal assist type magnetic head element, the amount of detected near-field light is suppressed.

However, since it is considered that the thermal assist type magnetic head element has an individual difference, the difference between the cantilever and the surface of the specimen was set to 100 nm or more so that the excitation amplitude of the cantilever was set to be as large as possible. Accordingly, it is possible to detect other light components, which are present in the vicinity of the near-field light, with high sensitivity by suppressing the amount of detected near-field light.

The basic configuration of a measurement apparatus for a thermal assist type magnetic head element according to a first example, which is based on the above-mentioned knowledge, is illustrated in FIG. 4A.

An inspection apparatus 100 for a thermal assist type magnetic head element illustrated in FIG. 4A can measure the intensity distribution of near-field light generated from a thermal assist type magnetic head element in a state of a row bar 40 (a block on which a plurality of head sliders are arranged) in a process before cutting slider elements (thin-film magnetic head chips) by machining a wafer, on which a plurality of thin-film thermal assist type magnetic head elements are formed, in a process for manufacturing the thermal assist type magnetic head element. Generally, about 40 to 90 head sliders (thin-film magnetic head elements) are arranged on the row bar 40 that is cut as an elongated block body, which has a dimension in the range of about 3 cm to 10 cm, from a wafer on which a plurality of thin-film magnetic head elements are formed.

The inspection apparatus 100 for a thermal assist type magnetic head element according to this example is formed using a scanning probe microscope as a base. The inspection apparatus 100 for a thermal assist type magnetic head element includes: an inspection stage 101; an X stage 106, a Y stage 105, and a Z stage 104 that are mounted on the inspection stage 101; a placement portion 114 which is provided on the Y stage and on which the row bar 40 is placed; an excitation unit 122 that vibrates the cantilever 1; a piezoelectric driver 107 that drives the X stage 106, the Y stage 105, the Z stage 104, and the excitation unit 122 by piezoelectric elements (not illustrated); a transmitter 102 that transmits high-frequency signals to the piezoelectric driver; a camera 103 that is fixed to the inspection stage 101 and images the cantilever 1 and the row bar 40 placed on the placement portion 114; a semiconductor laser element 109 that irradiates the cantilever 1 with a laser beam; a displacement sensor 110 that detects a laser beam reflected from the cantilever 1; a differential amplifier 111 that amplifies an output signal of the displacement sensor 110; a DC converter 112 that performs the A/D conversion of an output signal of the differential amplifier 111; a feedback controller 113 that receives an output signal of the DC converter 112 and generates a feedback signal; a detector 130 that detects light reflected and scattered from the probe 3; and a control unit PC 30 in which a lock-in amplifier 31 is built and which controls the entire apparatus.

One side surface of the row bar 40 in a longitudinal direction once butts against a reference face (a stepped surface formed on the Y stage 105) of the placement portion 114 that is provided on the upper surface of the Y stage 105 and is used to position the row bar 40. As a result, the row bar 40 is positioned in a Y direction.

The camera 103, which is used to measure the displacement of the row bar 40, is provided above the Y stage 105. The Z stage 104 is fixed to a pillar 1011 mounted on the measurement stage 101, and moves the cantilever 1 in a Z direction. The X stage 106, the Y stage 105, and the Z stage 104 of the measurement stage 101 are formed of piezoelectric stages that are driven by piezoelectric elements (not illustrated), respectively.

When the predetermined positioning of the row bar 40 is completed, an excitation signal, which is used to generate a writing magnetic field, is supplied to the row bar 40 from the control unit PC 30 and the row bar 40 is sucked and held by suction means (not illustrated) provided in the Y stage 105 so that a magnetic field can be generated on the placement portion 114 from a writing magnetic field generating portion 402 of a magnetic head element.

The piezoelectric driver 107 drives and controls the piezoelectric elements (not illustrated) that drive the X stage 106, the Y stage 105, and the Z stage 104 of the measurement stage 101, respectively. The control unit PC 30 includes a control computer, which uses a personal computer (PC) as a basic structure, and a lock-in amplifier. As illustrated in FIG. 4A, the cantilever 1, which can measure both near-field light and a magnetic field, is disposed at a position that is above and opposite to the row bar 40 placed on the Y stage 105 of the measurement stage 101.

The probe 3 illustrated in FIG. 2A is formed in the vicinity of the end portion of the cantilever 1, and the cantilever 1 is mounted on the excitation unit 122 that is provided below the Z stage 104. The excitation unit 122 is formed of a piezoelectric element, and an AC voltage of a frequency close to a mechanical resonance frequency is applied to the excitation unit 122 by an excitation voltage applied from the piezoelectric driver 107. Accordingly, the probe 3 formed at the end portion of the cantilever 1 is vibrated in the vertical direction (the Z direction).

The vibration of the probe 3 of the cantilever 1 in the Z direction is detected by a displacement detecting unit 120 that includes the semiconductor laser element 109 and the displacement sensor 110 formed of a four-divided photo-detector element. In the displacement detecting unit 120, the surface of the cantilever 1, which is opposite to the surface on which the probe 3 is formed, is irradiated with laser emitted from the semiconductor laser element 109, and laser reflected from the cantilever 1 is incident on the displacement sensor 110.

The displacement sensor 110 is a four-divided sensor of which the light receiving surface is divided into four areas, and laser incident on the respective divided light receiving surfaces of the displacement sensor 110 are photoelectrically converted and output as four electrical signals. Here, the displacement sensor 110 is installed at a position where light reflected from the cantilever 1 is evenly incident on the four divided light receiving surfaces when the displacement sensor 110 is irradiated with laser emitted from the semiconductor laser element 109 while the cantilever 1 is not vibrated by the excitation unit 122, that is, while the cantilever 1 stops.

The differential amplifier 111 performs predetermined arithmetic processing on differential signals between the four electrical signals output from the displacement sensor 110, and outputs the differential signals to the DC converter 112. That is, the differential amplifier 111 outputs displacement signals, which correspond to differences between the four electrical signals output from the displacement sensor 110, to the DC converter 112. Accordingly, while the cantilever 1 is not excited by the excitation unit 122, an output from the differential amplifier 111 is zero. The DC converter 112 is formed of an RMS-DC converter (Root Mean Squared value to Direct Current converter) converting the displacement signals, which are output from the differential amplifier 111, into DC signals having effective values.

The displacement signals, which are output from the differential amplifier 111, are signals corresponding to the displacement of the cantilever 1, and become AC signals since the cantilever 1 is vibrated. Signals output from the DC converter 112 are output to the feedback controller 113.

The feedback controller 113 outputs signals that are output from the DC converter 112 to the control unit PC 30 as signals used to monitor the magnitude of the current vibration of the cantilever 1, and outputs signals that are output from the DC converter 112 to the piezoelectric driver 107 through the control unit PC 30 as signals used to control the Z stage 104 that adjusts the magnitude of the excitation of the cantilever 1. The signal is monitored by the control unit PC 30, and the piezoelectric element (not illustrated) driving the Z stage 104 is controlled according to the value of the signal by the piezoelectric driver 107, so that the initial position of the cantilever 1 is adjusted before the start of measurement.

When measurement is performed in a magnetic force microscope (MFM) mode, first, the cantilever 1 is positioned by the Z stage 104 so that a tip portion of the probe 3, which includes a magnetic film and a noble metal film, of the cantilever 1 is positioned at a height corresponding to a head floating height Hf (a distance between the lowest position of the tip portion of the vibrating probe and the surface of the specimen) from the surface of a magnetic head element portion formed on the row bar 40. The head floating height Hf corresponds to the height of a magnetic head that floats from the surface of a magnetic disc when the magnetic head is disposed above the magnetic disc (not illustrated) rotating at a high speed.

While the cantilever 1 is driven and vibrated with a predetermined frequency by the excitation unit 122, the flat surface of a head of the row bar 40, which is parallel to the surface from which a writing magnetic field 403 (see FIG. 8) is generated, is scanned in the range of several to several tens μm square. In this embodiment, when the writing magnetic field 403 of the thermal assist type magnetic head element is measured in the MFM mode, a height between the head floating height of a hard disk drive and 50 nm is basically set as the scanning height of the cantilever 1.

When the near-field light and leaking light of the thermal assist type magnetic head element are measured in a scanning near-field optical microscope (SNOM) mode, the scanning height of the cantilever 1 (a distance between the lowest position of the tip portion of the vibrating probe and the surface of the specimen) is set to a height in the range of 0 to 150 nm.

Further, an oscillation signal, which is used to excite the cantilever 1, is supplied to the piezoelectric driver 107 from the transmitter 102 in order to control the vibration state of the cantilever. The piezoelectric driver 107 vibrates the cantilever 1 with a predetermined frequency by driving the excitation unit 122 on the basis of the oscillation signal supplied from the transmitter 102 so that the excitation unit 122 changes the vibration amplitude of the cantilever at the predetermined frequency according to a measurement purpose.

Figure 4B:
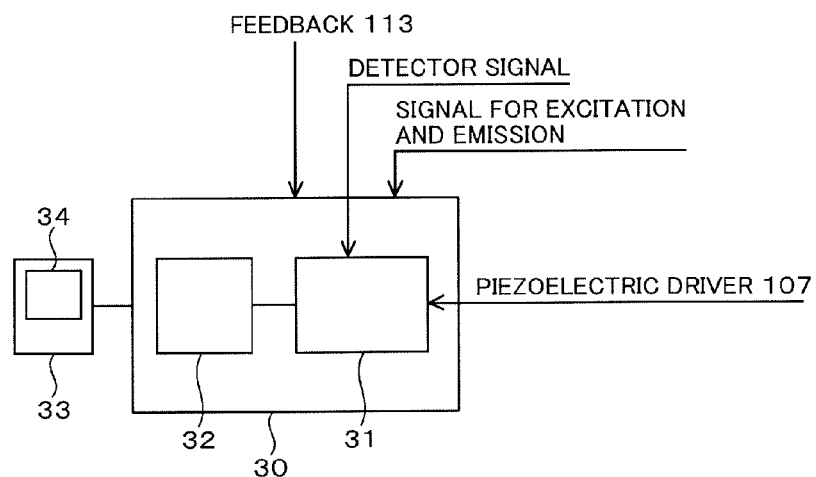
FIG. 4B is a block diagram illustrating the schematic configuration of a lock-in amplifier control unit PC of the inspection apparatus for a thermal assist type magnetic head element according to the first example of the invention.

Furthermore, an optical signal, which is detected by the detector 130 including a photomultiplier tube (PMT) or a photodiode (PD), is transmitted to the lock-in amplifier 31 of the control unit 30 illustrated in FIG. 4B. A vibration frequency signal of the cantilever 1 driven by the piezoelectric driver 107 or a signal of an integer multiple of a vibration frequency is input to the lock-in amplifier 31 as a reference signal.

A component of reflected and scattered light 301 of near-field light 203, which is generated from the probe 3 in an generation area of the near-field light 203, and a light component, which is related with the periodic vibration of the cantilever 1, of leaking light 204, which is reflected and scattered from the probe 3 in an area distant from the generation area of the near-field light 203, are extracted from the optical signal, which is detected by the detector 130, by the lock-in amplifier 31 to which the reference signal is input. The extracted signals are processed by a signal processing unit 32, so that the generation area of the near-field light 203 is detected.

A positional relationship between the cantilever 1 and the thermal assist type magnetic head element, which is required to measure thermal assist light (near-field light) of the thermal assist type magnetic head element according to the first example of the invention, and the setting of the vibration amplitude of the cantilever 1 at a predetermined frequency will be described with reference to FIGS. 5 and 6. Meanwhile, for simple description, the writing magnetic field generating portion 402 (see FIG. 8) is not illustrated in FIGS. 5 and 6.

Figure 5:
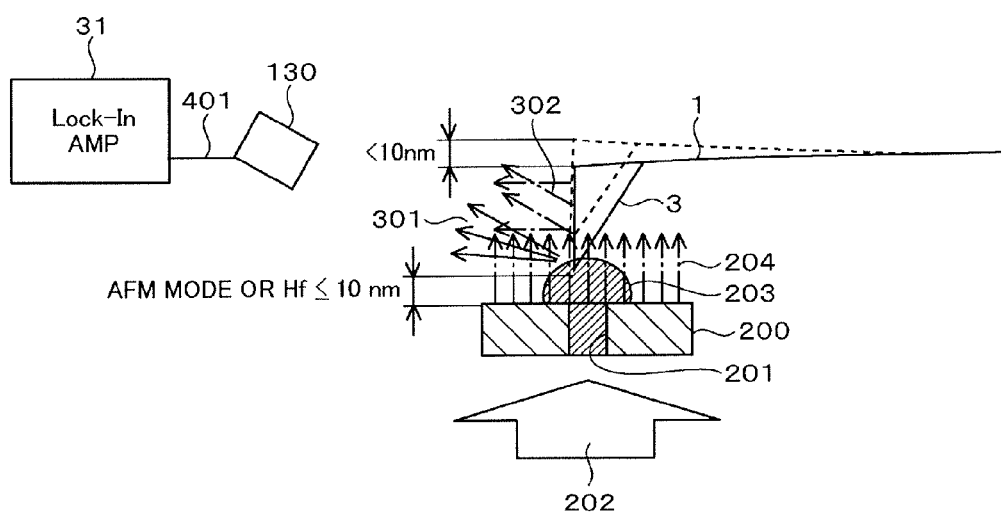
FIG. 5 is a diagram illustrating the detection principle of the inspection apparatus according to the first example of the invention, and is a side view of the cantilever, the thermal assist type magnetic head element, and a detection system, illustrating a state in which the vibration amplitude of the cantilever is set to about 10 nm or less and measurement is performed while scanning is performed along the surface of a specimen in an AFM mode or scanning is performed with a distance between the cantilever and the surface of the specimen set to 10 nm or less when an object to be measured is near-field light.

As illustrated in FIG. 5, for the generation of the near-field light 203 from an opening 201, excitation light 202 for the near-field light 203 is applied to a thermal assist type light (near-field light) emitting unit 200 of the thermal assist type magnetic head element from the side that is opposite to the side of the opening 201 from which the near-field light 203 is generated. Due to the structure of the near-field light emitting portion 200 of the thermal assist type magnetic head element, leaking light 204, which is generated when the excitation light 202 penetrates the near-field light emitting portion 200, is present in the vicinity of the opening 201. The leaking light 204 is generated in a relatively wide area including the light emitting area of the near-field light 203.

In order to more accurately find out the generation area of the near-field light 203, it is preferable that a detection signal of the scattered light 301, which is generated from the probe 3 by the near-field light 203 detected by the detector 130, can be separated from a detection signal of the scattered light 302 generated from the probe 3 by other light components different from the near-field light 203 such as the leaking light 204.

However, in reality, when the scattered light 301 generated from the probe 3 by the near-field light 203 is detected by the detector 130, the probe 3 does not completely enter the generation area of the near-field light 203 and a part of the probe 3 is present outside the generation area of the near-field light 203 as illustrated in FIG. 5. For this reason, the scattered light 302, which is generated by the leaking light 204, is also simultaneously generated from the probe 3.

Accordingly, the detector 130 detects the scattered light 301 and the scattered light 302 together. For this reason, when only the near-field light 203 should be detected, the detection signal of the scattered light 302 generated by the leaking light 204 different from the near-field light 203 becomes a noise component and becomes an obstacle to the accurate obtainment of the generation area of the near-field light 203.

For the detection of each of the two kinds of light components (the reflected and scattered light 301 generated from the probe 3 by the near-field light 203 and the reflected and scattered light 302 generated from the probe 3 by the leaking light 204), first, when the near-field light 203 is measured by the probe 3, the height of the cantilever 1 is adjusted by the Z stage 104 so that a distance between the tip of the probe 3 and the light emitting surface of the near-field light emitting portion 200 (or the height of the tip of the probe from the light emitting surface when the surface of the specimen is scanned by the probe 3 as in the atomic force microscope (AFM) mode) is set to 10 nm or less as illustrated in FIG. 5 by a solid line. In this state, the vibration amplitude of the cantilever 1 is set to 10 nm or less by the piezoelectric driver 107, the X stage 106 and the Y stage 105 are driven by the piezoelectric driver 107, and the surface of the specimen is scanned by the probe 3 while the probe 3 is vibrated.

At this time, the probe 3 is irradiated with the near-field light 203 in the area in which the near-field light 203 is generated. Accordingly, the scattered light 301 is generated from the probe 3. At this time, the scattered light 302, which is caused by the leaking light 204, is also generated from the probe 3. The detector 130 detects the scattered light 301, which is generated from the probe 3 by the near-field light 203, and the scattered light 302, which is generated from the probe 3 by the leaking light 204, together and outputs detection signals 401 to the lock-in amplifier 31. At this time, a signal having the frequency of an integer multiple (two to seven times) of the frequency of a driving signal of the cantilever 1, which is transmitted from the piezoelectric driver 107, is input to the lock-in amplifier 31 as a reference signal.

Harmonics are detected by the lock-in amplifier 31 to which the reference signal is input, and the detection signals are processed. Accordingly, a final detection signal becomes a signal in which a signal corresponding to the scattered light 301 generated from the probe 3 when the probe 3 is irradiated with the near-field light 203 is superimposed onto a signal corresponding to the scattered light 302 generated from the probe 3 when the probe 3 is irradiated with the leaking light 204.

Further, when the vibration amplitude of the cantilever 1 is set to about 10 nm smaller than about 40 nm that is a normal amplitude in the AFM mode, a distance between the tip portion of the probe 3 and the light emitting surface of the near-field light emitting portion 200 becomes 20 nm or less at most.

Accordingly, when a relationship between the generation area of the near-field light 203 and the vibration area of the probe 3 is set to a state illustrated in FIG. 3B, it is possible to increase the detection intensity of near-field light. As a result, it is also possible to solve a problem of low detection signal intensity that has been a problem in the detection of harmonics in the related art.

Figure 6:
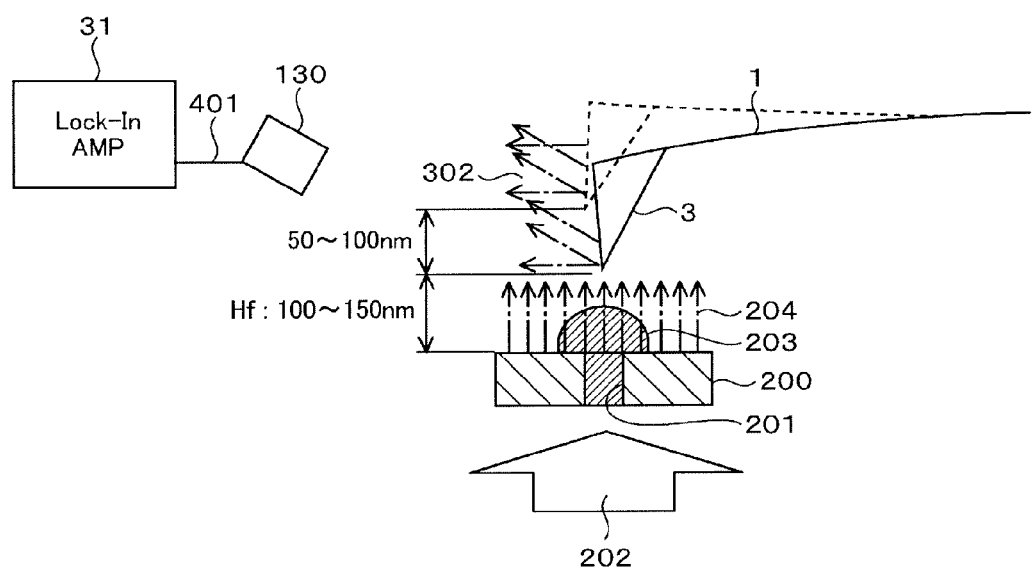
FIG. 6 is a diagram illustrating the detection principle of an inspection method and the inspection apparatus according to the first example of the invention, and is a side view of the cantilever, the thermal assist type magnetic head element, and the detection system, illustrating a state in which a distance between the cantilever and the surface of the specimen is set to 100 to 150 nm or more, the excitation amplitude of the cantilever is set in the range of about 50 to 100 nm, and measurement is performed when an object to be measured is leaking light of near-field light excitation light.

Next, when the leaking light 204 present in the vicinity of the near-field light 203 generated by the thermal assist type magnetic head element is measured, a distance between the cantilever 1 and the surface of the near-field light emitting portion 200 is set to 100 to 150 nm or more and the excitation amplitude of the cantilever 1 is set in the range of about 50 to 100 nm as illustrated in FIG. 6. Since the probe 3 does not enter the light emitting area of the near-field light 203 (an area up to a height of about 20 nm from the surface of the near-field light emitting portion 200) at this time, the scattered light 301 caused by the near-field light 203 is not generated from the probe 3 and the probe 3 is irradiated with only the leaking light 204. Accordingly, the scattered light 302 caused by the leaking light 204 is generated from the probe 3.

The detector 130 detects the scattered light 302 generated from the probe 3, and outputs the detection signals 401. Since the detection signals 401 are input to the lock-in amplifier 31 to which a signal having a predetermined frequency vibrating and driving the cantilever 1 is input as a reference signal and are processed, a final detection signal becomes a component, which depends on the vibration of the cantilever 1, of light reflected from the probe 3. Accordingly, since the signal of the detected propagation light increases the vibration amplitude of the cantilever 1 as described with reference to FIGS. 2A and 2B, high-sensitivity detection can be performed.

Figure 7:
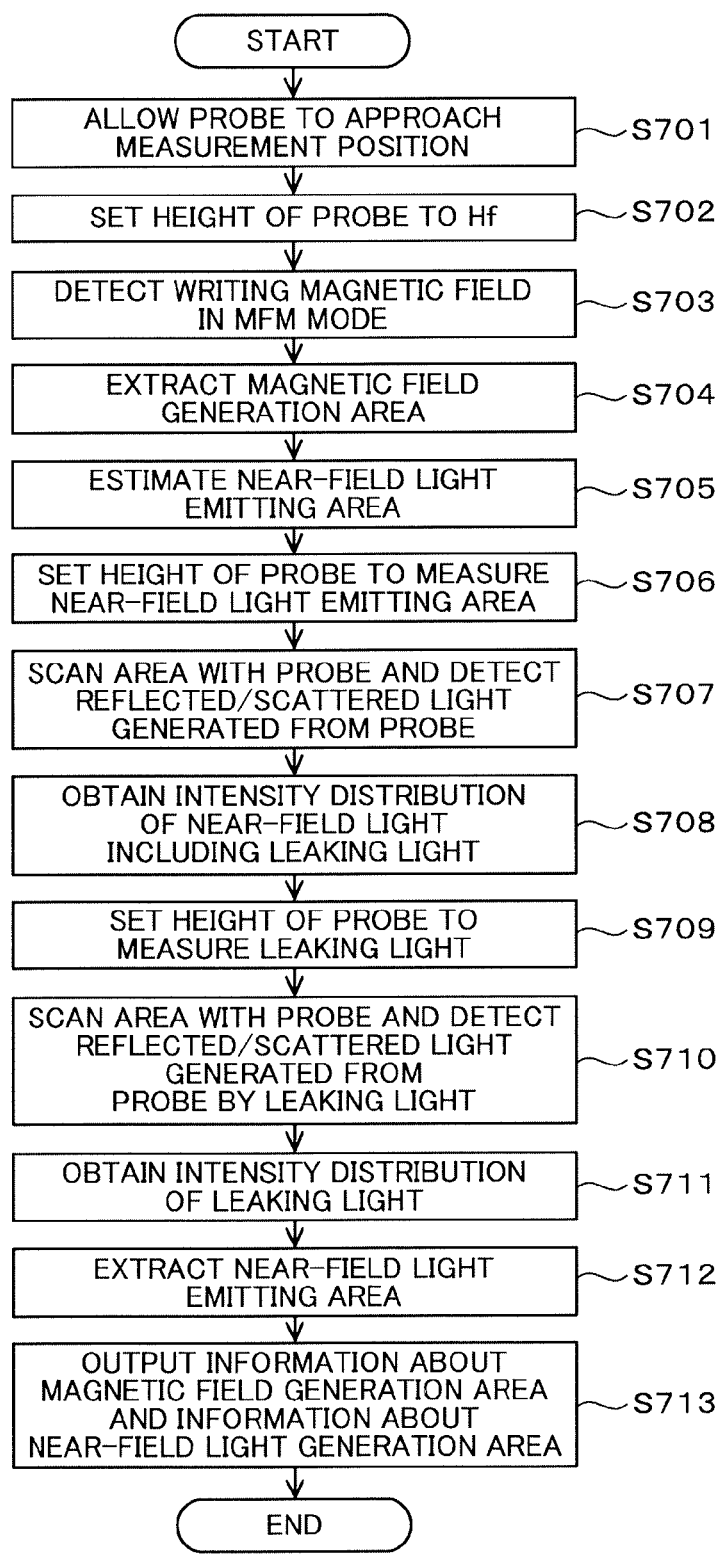
FIG. 7 is a flowchart illustrating the flow of processing according to the first example of the invention.

FIG. 7 illustrates the flow of processing of an inspection method for a thermal assist type magnetic head element according to this example.

First, the X stage 106 and the Y stage 105 are driven by the piezoelectric driver 107 to allow the probe 3 to approach a measurement position on the upper surface of the magnetic field generating portion of the thermal assist type magnetic head element (S701). Next, the Z stage 104 is controlled by the piezoelectric driver 107 so that a distance between the tip of the probe 3 of the cantilever 1 and the surface of the thermal assist type magnetic head element including the near-field light emitting portion 200 is set to a height corresponding to the head floating height Hf (S702).

After that, the writing magnetic field 403 (see FIG. 8) is generated from the writing magnetic field generating portion 402 (see FIG. 8) of the thermal assist type magnetic head element, and a writing magnetic field generation area is detected in the MFM mode (S703). That is, while the writing magnetic field 403 is generated in the thermal assist type magnetic head element of the row bar 40 by means (not illustrated), the excitation unit 122 is driven by the piezoelectric driver 107 to excite the cantilever 1 and the X stage 106 and the Y stage 105 are driven by the piezoelectric driver 107 to allow the probe 3 to scan an area of 2 to 5 µm square of the surface of the thermal assist type magnetic head element including the near-field light emitting portion 200. Laser, which is emitted from the semiconductor laser 109 and reflected by the cantilever 1, is detected by the displacement sensor 110, so that the change of the amplitude of the cantilever 1 at this time is detected.

Next, detection signals output from the displacement sensor 110 are input to the operating amplifier 111 and a difference signal between the detection signals output from the displacement sensor 110 is taken, so that the writing magnetic field generation area of the thermal assist type magnetic head element is obtained from the change of the amplitude of the cantilever 1 (S704).

After that, the position of the near-field light emitting portion 200 of the thermal assist type magnetic head element is estimated from information about the position of the obtained magnetic field generation area with reference to design data (S705). While the generation of the writing magnetic field 403 in the thermal assist type magnetic head element stops, the X stage 106 and the Y stage 105 are controlled by the piezoelectric driver 107 to position the probe 3, which is formed at the end portion of the cantilever 1, in an area including the estimated near-field light emitting portion 200 and the Z stage 104 is controlled by the piezoelectric driver 107 so that a distance between the tip of the probe 3 and the surface of the thermal assist type magnetic head element including the near-field light emitting portion 200 is set to 10 nm (S706).

Next, while the opening 201 of the near-field light emitting portion 200 is irradiated with the excitation light 202 to generate the near-field light 203, the excitation unit 122 is driven by the piezoelectric driver 107 to excite the cantilever 1 with an amplitude of 10 nm, the X stage 106 and the Y stage 105 are driven by the piezoelectric driver 107 to allow the probe 3 to scan an area of 0.5 to 1 µm square of the surface of the thermal assist type magnetic head element including the near-field light emitting portion 200, and the scattered light 301 and the scattered light 302 generated from the probe 3, which are irradiated with the thermal assist light 203 and the leaking light 204, are detected by the detector 130 (S707).

The detection signals 401 output from the detector 130, which detects the scattered light 301 and the scattered light 302 generated from the probe 3, are input to the lock-in amplifier 31 to which a vibration frequency signal of the cantilever 1 driven by the piezoelectric driver 107 or a signal of an integer multiple of a vibration frequency is input as a reference signal; a signal having a period, which corresponds to the vibration frequency of the cantilever 1 or an integer multiple of the vibration frequency, is extracted among the detection signals 401 output from the detector 130; and the intensity distribution of the near-field light 203 including the leaking light 204 is obtained by the signal processing unit 32 (S708).

When the scanning of a predetermined area performed by the probe 3 is completed, the Z stage 104 is controlled by the piezoelectric driver 107 so that a distance between the tip of the probe 3 and the surface of the thermal assist type magnetic head element including the near-field light emitting portion 200 is set in the range of 100 to 150 nm equal to or larger than the height of an area in which the near-field light 203 is generated (S709).

Next, the excitation unit 122 is driven by the piezoelectric driver 107 to excite the cantilever 1 with an amplitude of 50 to 100 nm, the X stage 106 and the Y stage 105 are driven by the piezoelectric driver 107 to allow the probe 3 to scan an area of 0.5 to 1 µm square of the surface of the thermal assist type magnetic head element including the near-field light emitting portion 200 as in the case of S708, and the scattered light 302 generated from the probe 3, which is irradiated with the leaking light 204 generated from the near-field light emitting portion 200 due to the irradiation using the excitation light 202, is detected by the detector 130 (S710).

The detection signals 401 output from the detector 130, which detects the scattered light 302 generated from the probe 3, are input to the lock-in amplifier 31 to which a vibration frequency signal of the cantilever 1 driven by the piezoelectric driver 107 or a signal of an integer multiple of a vibration frequency is input as a reference signal; a signal having a period, which corresponds to the vibration frequency of the cantilever 1 or an integer multiple of the vibration frequency, is extracted among the detection signals 401 output from the detector 130; and the intensity distribution of the leaking light 204 is obtained by the signal processing unit 32 (S711).

Next, the irradiation of the opening 201 of the near-field light emitting portion 200 with the excitation light 202 stops; and the generation area of the near-field light 203 is extracted using information about the intensity distribution of the near-field light 203 including the leaking light 204, which is obtained in S708, and information about the intensity distribution of the leaking light 204, which is obtained in S711, by the signal processing unit 32 of the control unit PC 30 (S712).

Specifically, the signal processing unit 32 obtains the spatial intensity distribution of the near-field light 203 by subtracting the intensity of the leaking light 204 at the same position, which is obtained in S711, from the intensity of the near-field light 203 including the leaking light 204 that is obtained in S708; and compares the obtained intensity of the near-field light 203 with a preset threshold and obtains an area having spatial intensity distribution, which is larger than the threshold, as the generation area of the near-field light 203.

Finally, the control unit PC 30 displays information about the magnetic field generation area of the thermal assist type magnetic head element, which is obtained in S704, and information about the generation area of the near-field light 203, which is obtained in S712, on a screen 34 of a display device 33 (S713).

According to this example, it was possible to more accurately obtain the generation area of the near-field light 203 by subtracting the detection signal of the scattered light 302 generated by the leaking light 204, which is obtained when the probe 3 scans an area which is sufficiently distant from the generation area of the near-field light 203 and in which only the leaking light 204 is present, from the detection signals of the scattered light 301 generated by the near-field light 203 and the scattered light 302 generated by the leaking light 204 that are obtained when the probe 3 scans the vicinity of the surface of the near-field light emitting portion 200 from which the near-field light 203 is generated.

Second Example

An inspection apparatus for a thermal assist type magnetic head element using a measurement method according to a second example of the invention has basically the same structure as the inspection apparatus 100 for a thermal assist type magnetic head element that is illustrated in FIG. 4 and is described in the first example. Repeated description will be omitted here.

The second example is different from the first example in that, when measurement of the second example is performed, the measurement of a writing magnetic field to be generated and the measurement of other light components, such as leaking light of excitation light for near-field light present in the vicinity of near-field light generated by a thermal assist type magnetic head element, are simultaneously performed by one-time scanning of a writing magnetic field generation area of the thermal assist type magnetic head element that is performed by a probe of a cantilever.

Figure 8:
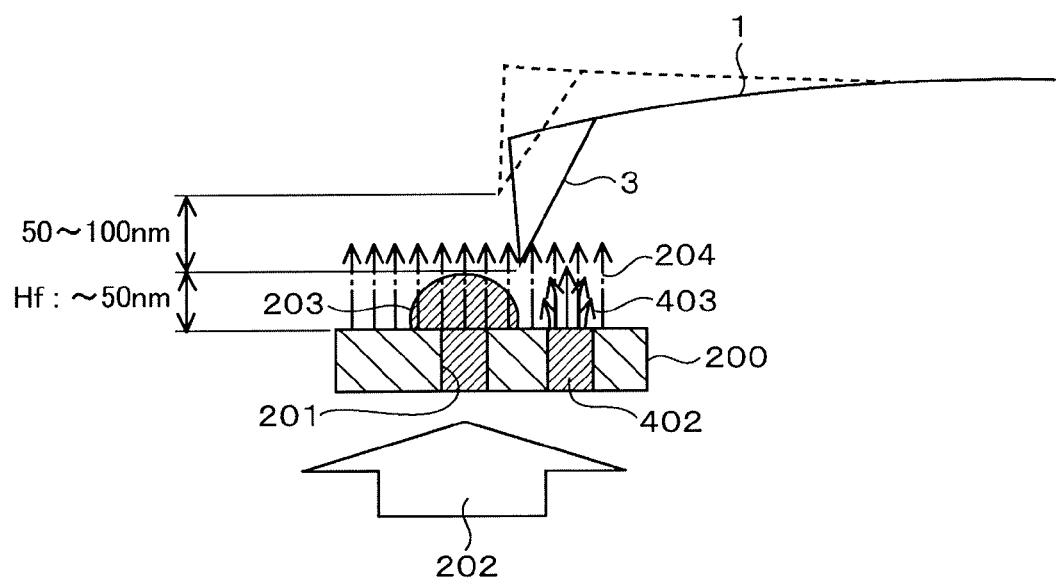
FIG. 8 is a diagram illustrating the detection principle of an inspection apparatus according to a second example of the invention, and is a side view of a cantilever and a thermal assist type magnetic head element, illustrating a state in which a distance between a cantilever and the surface of a specimen is set to 50 nm or more, the excitation amplitude of the cantilever is set in the range of about 50 to 100 nm, and measurement is performed when an object to be measured is both leaking light of near-field light excitation light and a writing magnetic field.

As illustrated in FIG. 8, a writing magnetic field 403, which is generated from a writing magnetic field generating portion 402 of the thermal assist type magnetic head element, spatially overlaps other light components, such as leaking light 204 of excitation light 202 for near-field light present in the vicinity of near-field light 203. Further, when a magnetic field is measured in an MFM, sensitivity becomes higher as the vibration amplitude of the probe 3 of the cantilever 1 is increased. Accordingly, it is necessary to set conditions that are required to simultaneously measure a magnetic field and leaking light.

Generally, when a magnetic field is measured, a distance between the cantilever 1 and the surface of a specimen 200 needs to be set in the range of about 10 to 50 nm. However, in order to simultaneously measure both a magnetic field and leaking light at this time, a distance between the cantilever 1 and the surface of the specimen 200 was set in the range of 20 to 50 nm and the vibration amplitude of the cantilever was set in the range of about 50 to 100 nm. Accordingly, the writing magnetic field 403, which is generated by the thermal assist type magnetic head element, and the leaking light 204, which is present in the vicinity of the near-field light 203, can be simultaneously detected with high sensitivity by an effect of increasing the vibration amplitude of the cantilever.

Figure 9:
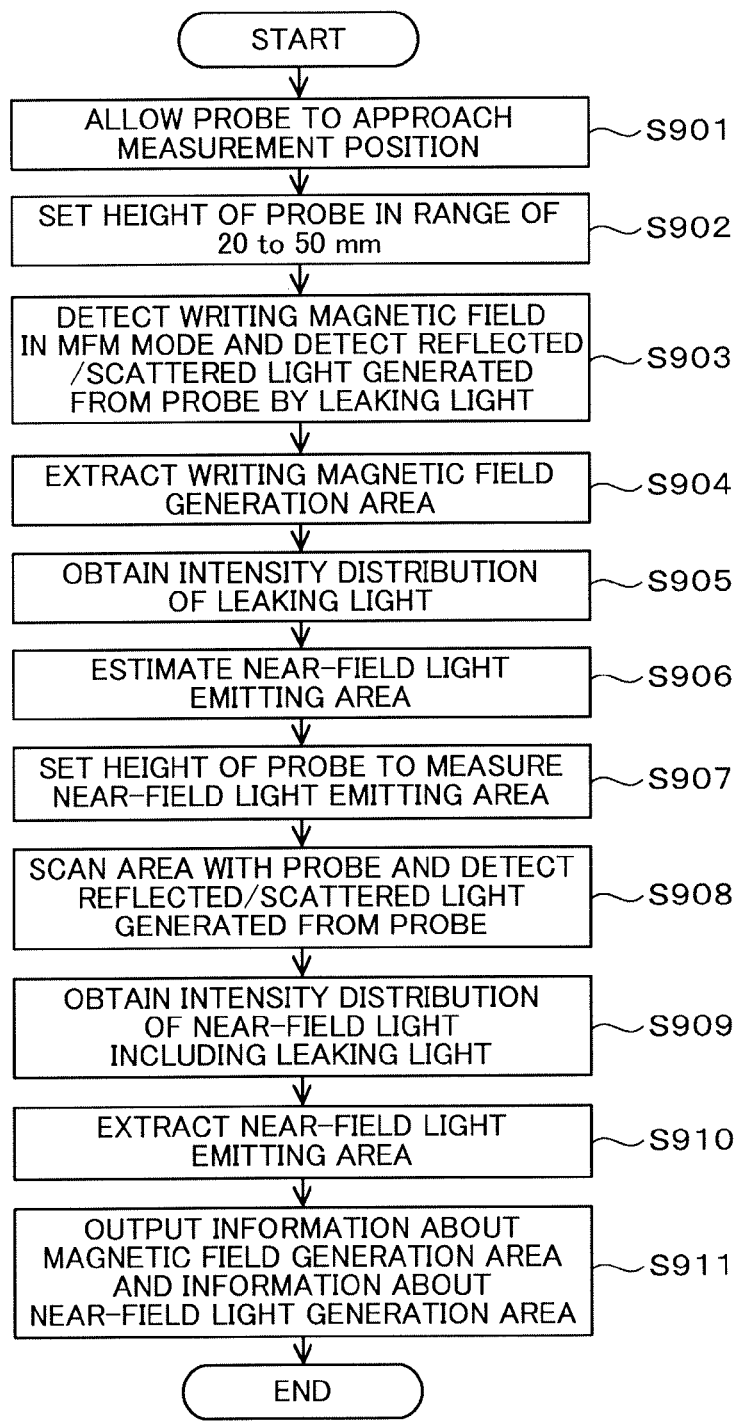
FIG. 9 is a flowchart illustrating the flow of processing according to the second example of the invention.

FIG. 9 illustrates the flow of processing of an inspection method for a thermal assist type magnetic head element according to this example.

First, the X stage 106 and the Y stage 105 are driven by the piezoelectric driver 107 to allow the probe 3 to approach a measurement position on the upper surface of the magnetic field generating portion of the thermal assist type magnetic head element (S901). Next, the Z stage 104 is controlled by the piezoelectric driver 107 so that a distance between the tip of the probe 3 of the cantilever 1 and the surface of the thermal assist type magnetic head element including the near-field light emitting portion 200 is set in the range of 20 to 50 nm (S902).

After that, the writing magnetic field 403 is generated from the writing magnetic field generating portion 402 of the thermal assist type magnetic head element and a writing magnetic field generation area is detected in the MFM mode; the opening 201 of the near-field light emitting portion 200 is irradiated with the excitation light 202 to generate the near-field light 203; and the scattered light 302 generated from the probe 3, which is irradiated with the leaking light 204 generated from the near-field light emitting portion 200 due to the irradiation using the excitation light 202, is detected by the detector 130 (S903).

That is, while the writing magnetic field 403 is generated from the writing magnetic field generating portion 402 of the thermal assist type magnetic head element of the row bar 40 by means (not illustrated), the excitation unit 122 is driven by the piezoelectric driver 107 to excite the cantilever 1 with an amplitude of 50 to 100 nm and the X stage 106 and the Y stage 105 are driven by the piezoelectric driver 107 to allow the probe 3 to scan an area of 2 to 5 μm square of the surface of the thermal assist type magnetic head element including the near-field light emitting portion 200. Laser, which is emitted from the semiconductor laser 109 and reflected by the cantilever 1, is detected by the displacement sensor 110, so that the change of the amplitude of the cantilever 1 at this time is detected. Further, at the same time, the scattered light 302 generated from the probe 3, which is irradiated with the leaking light 204, is detected by the detector 130.

Next, detection signals output from the displacement sensor 110 are input to the operating amplifier 111 and a difference signal between the detection signals output from the displacement sensor 110 is taken, so that the writing magnetic field generation area of the thermal assist type magnetic head element is obtained from the change of the amplitude of the cantilever 1 (S904).

Furthermore, the detection signals 401 output from the detector 130, which detects the scattered light 302 generated from the probe 3, are input to the lock-in amplifier 31 to which a vibration frequency signal of the cantilever 1 driven by the piezoelectric driver 107 or a signal of an integer multiple of a vibration frequency is input as a reference signal; a signal having a period, which corresponds to the vibration frequency of the cantilever 1 or an integer multiple of the vibration frequency, is extracted among the detection signals 401 output from the detector 130; and the intensity distribution of the leaking light 204 is obtained by the signal processing unit 32 (S905).

After that, the position of the near-field light emitting portion 200 of the thermal assist type magnetic head element is estimated from information about the position of the obtained magnetic field generation area with reference to design data (S906). While the generation of the writing magnetic field performed by the thermal assist type magnetic head element stops, the X stage 106 and the Y stage 105 are controlled by the piezoelectric driver 107 to position the probe 3, which is formed at the end portion of the cantilever 1, in an area including the estimated near-field light emitting portion 200 and the Z stage 104 is controlled by the piezoelectric driver 107 so that a distance between the tip of the probe 3 and the surface of the thermal assist type magnetic head element including the near-field light emitting portion 200 is set to 10 nm (S907).

Next, the excitation unit 122 is driven by the piezoelectric driver 107 to excite the cantilever 1 with an amplitude of 10 nm, the X stage 106 and the Y stage 105 are driven by the piezoelectric driver 107 to allow the probe 3 to scan an area of 0.5 to 1 μm square of the surface of the thermal assist type magnetic head element including the near-field light emitting portion 200, and the scattered light 301 and the scattered light 302 generated from the probe 3, which is irradiated with the thermal assist light 203 and the leaking light 204, are detected by the detector 130 (S908).

The detection signals 401 output from the detector 130, which detects the scattered light 301 and the scattered light 302 generated from the probe 3, are input to the lock-in amplifier 31 to which a vibration frequency signal of the cantilever 1 driven by the piezoelectric driver 107 or a signal of an integer multiple of a vibration frequency is input as a reference signal; a signal having a period, which corresponds to the vibration frequency of the cantilever 1 or an integer multiple of the vibration frequency, is extracted among the detection signals 401 output from the detector 130; and the intensity distribution of the near-field light 203 including the leaking light 204 is extracted by the signal processing unit 32 (S909).

Next, the generation area of the near-field light 203 is extracted using information about the intensity distribution of the near-field light 203 including the leaking light 204, which is obtained in S909, and information about the intensity distribution of the leaking light 204, which is obtained in S905, by the signal processing unit 32 of the control unit PC 30 (S910). Specifically, the signal processing unit 32 obtains the spatial intensity distribution of the near-field light 203 by subtracting the intensity of the leaking light 204 at the same position, which is obtained in S905, from the intensity of the near-field light 203 including the leaking light 204 that is obtained in S909; and compares the obtained spatial intensity distribution of the near-field light 203 with a preset threshold and obtains an area having intensity, which is larger than the threshold, as the generation area of the near-field light 203.

Finally, the control unit PC 30 displays information about the magnetic field generation area of the thermal assist type magnetic head element, which is obtained in S904, and information about the generation area of the near-field light 203, which is obtained in S910, on a screen 34 of a display device 33 (S911).

According to this example, in addition to the effect mentioned in the first example, it is possible to shorten measurement time since the measurement of the distribution of a writing magnetic field in the MFM mode and the measurement of the distribution of leaking light can be performed by one-time scanning that is performed by the probe 3.

Third Example

An inspection apparatus for a thermal assist type magnetic head element using a measurement method according to a third example has basically the same structure as the inspection apparatus 100 for a thermal assist type magnetic head element that is illustrated in FIG. 4 and is described in the first example. Repeated description will be omitted here.

The third example is different from the first example in that, when measurement of the third example is performed, the measurement of near-field light 203 to be generated and the measurement of leaking light 240 of excitation light for near-field light present in the vicinity of near-field light generated by a thermal assist type magnetic head element, are sequentially performed by one-time reciprocating scanning that is performed by a cantilever 1. That is, in this example, S706, S707 and S709, S710 of the flowchart of FIG. 7 were adapted to be alternately performed by one-time reciprocating scanning that was performed by the cantilever 1.

As illustrated in FIG. 10A or 10B, the cantilever 1 can repeatedly scan the same measurement area 1001 in a horizontal direction (FIG. 10A) or a vertical direction (FIG. 10B). Accordingly, when the one-time reciprocating scanning of the same area is performed in the horizontal direction or the vertical direction, near-field light can be measured during the scanning in one direction and leaking light can be measured at a position, which is sufficiently distant from the generation area of the near-field light in a height direction, during the scanning in the opposite direction.

Specifically, when the cantilever 1 performs the going (or returning) of one-time return scanning, reflected and scattered near-field light is detected by the probe 3 while the vibration amplitude of the cantilever is set to 10 nm or less and the surface of a specimen is scanned in the AFM mode (a distance between the probe 3 and the surface of the specimen is set in the range of 0 to 10 nm) as illustrated in FIG. 5 of the first example.

Meanwhile, when the cantilever 1 performs the returning (or going) of one-time return scanning, a distance between the cantilever 1 and the surface of the specimen is set in the range of 100 to 150 nm, the excitation amplitude of the cantilever is set in the range of about 50 to 10 nm, and reflected and scattered leaking light 204 is detected by the probe 3 as illustrated in FIG. 6 of the first example.

Figure 11:
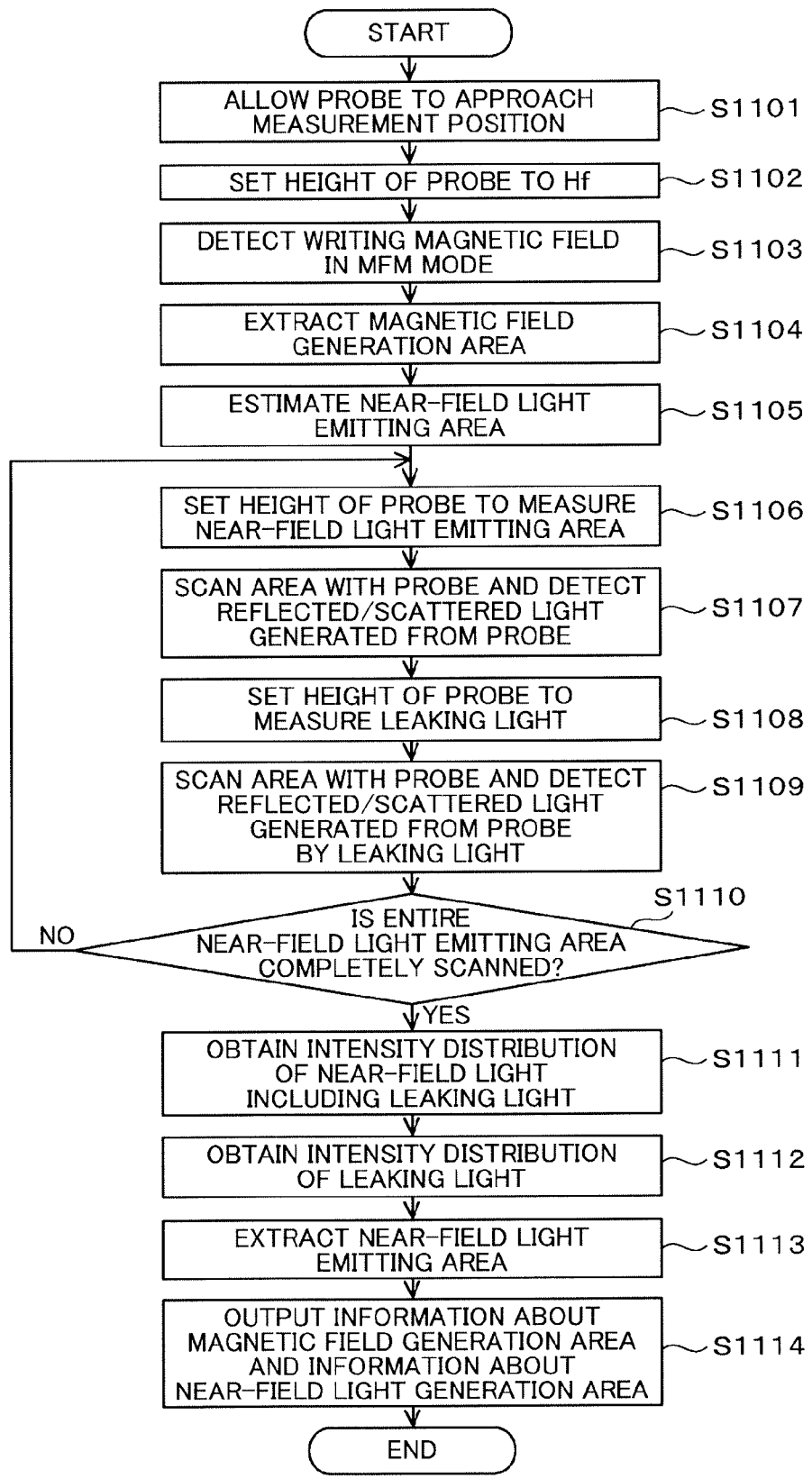
FIG. 11 is a flowchart illustrating the flow of processing according to the third example of the invention.

FIG. 11 illustrates the flow of processing of an inspection method for a thermal assist type magnetic head element according to this example.

First, the magnetic field generation area of the thermal assist type magnetic head element is obtained in S1101 to S1104, and these processes are the same as the steps of S701 to S704 described in the first example.

After that, the position of the near-field light emitting portion 200 of the thermal assist type magnetic head element is estimated from information about the position of the magnetic field generation area, which is obtained in S1104, with reference to design data (S1105). While the generation of the writing magnetic field 403 in the thermal assist type magnetic head element stops, the X stage 106 and the Y stage 105 are controlled by the piezoelectric driver 107 to position the probe 3, which is formed at the end portion of the cantilever 1, in an area including the estimated near-field light emitting portion 200 and the Z stage 104 is controlled by the piezoelectric driver 107 so that a distance between the tip of the probe 3 and the surface of the thermal assist type magnetic head element including the near-field light emitting portion 200 is set to 10 nm (S1106).

Next, the excitation unit 122 is driven by the piezoelectric driver 107 to excite the cantilever 1 with an amplitude of 10 nm, the X stage 106 and the Y stage 105 are driven by the piezoelectric driver 107 to allow the probe 3 to scan an area of 0.5 to 1 μm square of the surface of the thermal assist type magnetic head element, which includes the near-field light emitting portion 200, as a scanning area in any one direction of a direction from the left to the right in FIG. 10A and a direction from the upper side to the lower side in FIG. 10B, and the scattered light 301 and the scattered light 302 generated from the probe 3, which is irradiated with the thermal assist light 203 and the leaking light 204, are detected by the detector 130 (S1107).

After that, when the probe 3 reaches one end portion of the scanning area in one direction, the Z stage 104 is controlled by the piezoelectric driver 107 so that a distance between the tip of the probe 3 and the surface of the thermal assist type magnetic head element including the near-field light emitting portion 200 is set in the range of 100 to 150 nm equal to or larger than the height of an area in which the near-field light 203 is generated (S1108). Then, the excitation unit 122 is driven by the piezoelectric driver 107 to excite the cantilever 1 with an amplitude of 50 to 100 nm, the X stage 106 or the Y stage 105 is driven in a direction opposite to the direction of S1107 by the piezoelectric driver 107 (S1109).

When the probe 3 reaches the other end portion of the scanning area, it is determined whether or not the entirety of a predetermined scanning area including the near-field light emitting area is completely scanned (S1110). If the entirety of the predetermined scanning area is not completely scanned, the flow returns to S1106.

When steps of S1106 to S1109 are sequentially and repeatedly performed and the entirety of the area of 0.5 to 1 μm square of the surface of the thermal assist type magnetic head element including the near-field light emitting portion 200 is scanned, the detection signals 401 output from the detector 130, which detects the scattered light 301 and the scattered light 302 generated from the probe 3 and obtained through the repetition of S1107, are input to the lock-in amplifier 31 to which a vibration frequency signal of the cantilever 1 driven by the piezoelectric driver 107 or a signal of an integer multiple of a vibration frequency is input as a reference signal, a signal having a period, which corresponds to the vibration frequency of the cantilever 1 or an integer multiple of the vibration frequency, is extracted among the detection signals 401 output from the detector 130, and the intensity distribution of the near-field light 203 including the leaking light 204 is extracted by the signal processing unit 32 (S1111).

Further, the detection signals 401 output from the detector 130, which detects the scattered light 302 generated from the probe 3 in S1109, are input to the lock-in amplifier 31 to which a vibration frequency signal of the cantilever 1 driven by the piezoelectric driver 107 or a signal of an integer multiple of a vibration frequency is input as a reference signal; a signal having a period, which corresponds to the vibration frequency of the cantilever 1 or an integer multiple of the vibration frequency, is extracted among the detection signals 401 output from the detector 130; and the intensity distribution of the leaking light 204 is obtained by the signal processing unit 32 (S1112).

Next, the generation area of the near-field light 203 is extracted using information about the intensity distribution of the near-field light 203 including the leaking light 204, which is obtained in S1111, and information about the intensity distribution of the leaking light 204, which is obtained in S1112, by the signal processing unit 32 of the control unit PC 30 (S1113). Specifically, the signal processing unit 32 obtains the spatial intensity distribution of the near-field light 203 by subtracting the intensity of the leaking light 204 at the same position, which is obtained in S1112, from the intensity of the near-field light 203 including the leaking light 204 that is obtained in S1111; and compares the obtained spatial intensity distribution of the near-field light 203 with a preset threshold and obtains an area having intensity, which is larger than the threshold, as the generation area of the near-field light 203.

Finally, the control unit PC 30 displays information about the magnetic field generation area of the thermal assist type magnetic head element, which is obtained in S1104, and information about the generation area of the near-field light 203, which is obtained in S1113, on a screen 34 of a display device 33 (S1114).

According to this example, in addition to the effect mentioned in the first example, it is possible to shorten measurement time since the measurement of the near-field light generation area and the measurement of the distribution of leaking light can be performed by one-time scanning of the near-field light generation area that is performed by the probe 3.

Meanwhile, the inspection of the magnetic head element in a state of a row bar has been described in the above-mentioned examples, but the invention is not limited thereto. For example, a slider, which is obtained by cutting the magnetic head element one by one from the row bar, can also be measured by the inspection apparatus for a thermal assist type magnetic head element, which has been described in the first example, the second example, or the third example.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

The invention claimed is:

1. An inspection apparatus for a thermal assist type magnetic head element, the inspection apparatus comprising:
   a table unit on which a thermal assist type magnetic head element, which is a specimen, including a magnetic field generating portion and a near-field light emitting portion is placed and which is movable in a plane;
   a cantilever that includes a probe including a magnetic film and a noble metal film on a surface thereof and scans the surface of the specimen placed on the table unit;
   a probe height adjusting unit that adjusts a distance between the probe of the cantilever and the surface of the specimen;
   a vibration driving unit that vibrates the cantilever with a predetermined period and a predetermined amplitude in a vertical direction relative to the surface of the specimen;
   a signal output unit that outputs a signal generating a magnetic field from the magnetic field generating portion of the thermal assist type magnetic head element and a signal for generating near-field light from the near-field light emitting portion;
   a displacement detecting unit that detects the vibration of the cantilever by irradiating the surface of the cantilever opposite to the surface of the cantilever, on which the probe is formed, with light and detecting light reflected from the cantilever when the thermal assist type magnetic head element is moved in a plane by the table unit while a magnetic field is generated from the magnetic field generating portion of the thermal assist type magnetic head element by the signal output from the signal output unit and the cantilever is vibrated by the vibration driving unit;
   a scattered light detecting unit that detects scattered light generated from the surface of the probe of the cantilever by near-field light, which is generated from the near-field light emitting portion of the thermal assist type magnetic head element by the signal output from the signal output unit, and leaking light; and
   a controller that includes a lock-in amplifier to which a frequency signal allowing the vibration driving unit to vibrate the cantilever with a predetermined period or a signal of an integer multiple of the frequency signal is input as a reference signal and which extracts a scattered light component of the near-field light and a scattered light component of the leaking light from a detection signal obtained when the scattered light is detected by the scattered light detecting unit, and a signal processing unit obtaining a generation area of the near-field light of the thermal assist type magnetic head element from the scattered light component of the near-field light and the scattered light component of the leaking light extracted by the lock-in amplifier, and the controller controlling the table unit, the probe height adjusting unit, the vibration driving unit, the signal output unit, the displacement detecting unit, and scattered light detecting unit.

2. The inspection apparatus for a thermal assist type magnetic head element according to claim 1,
   wherein the controller controls the probe height adjusting unit and the vibration driving unit to switch a height of the probe and a vibration amplitude of the probe to a case in which the generation area of the near-field light generated from the near-field light emitting portion of the thermal assist type magnetic head element is scanned and measured by the probe of the cantilever and a case in which an area distant from the generation area of the near-field light in a height direction is scanned and measured by the probe of the cantilever.

3. The inspection apparatus for a thermal assist type magnetic head element according to claim 2,
   wherein when the generation area of the near-field light generated from the near-field light emitting portion of the thermal assist type magnetic head element is scanned and measured by the probe of the cantilever, the controller controls the probe height adjusting unit to set the height of the probe to 10 nm or less and controls the vibration driving unit to set the vibration amplitude of the probe to 10 nm or less.

4. The inspection apparatus for a thermal assist type magnetic head element according to claim 2,
   wherein when an area distant from the generation area of the near-field light in the height direction is scanned and measured by the probe of the cantilever, the controller controls the probe height adjusting unit to set the height of the probe to 100 to 150 nm or more and controls the vibration driving unit to set the vibration amplitude of the probe in the range of 50 to 100 nm.

5. The inspection apparatus for a thermal assist type magnetic head element according to claim 1,
   wherein when the generation area of the near-field light generated from the near-field light emitting portion of the thermal assist type magnetic head element is scanned and measured by the probe of the cantilever, the controller controls the probe height adjusting unit to set the height of the probe to 10 nm or less and controls the vibration driving unit to set the vibration amplitude of the probe to 10 nm or less.

6. The inspection apparatus for a thermal assist type magnetic head element according to claim 1,
   wherein when an area distant from the generation area of the near-field light in the height direction is scanned and measured by the probe of the cantilever, the controller controls the probe height adjusting unit to set the height of the probe to 100 to 150 nm or more and controls the vibration driving unit to set the vibration amplitude of the probe in the range of 50 to 100 nm.

7. The inspection apparatus for a thermal assist type magnetic head element according to claim 1,
wherein when the thermal assist type magnetic head element is moved in a plane by the table unit and the vibration of the cantilever is detected by the displacement detecting unit while a writing magnetic field is generated from the magnetic field generating portion of the thermal assist type magnetic head element and the cantilever is vibrated by the vibration driving unit and when an area distant from the generation area of the near-field light in the height direction is scanned by the probe of the cantilever to measure the leaking light, the controller sets the height of the probe adjusted by the probe height adjusting unit in the range of 20 to 50 nm, sets the vibration amplitude of the probe driven by the vibration driving unit in the range of 50 to 100 nm, and simultaneously performs the measurement of the writing magnetic field and the measurement of the leaking light.

8. The inspection apparatus for a thermal assist type magnetic head element according to claim 1,
wherein the controller switches the scanning and measurement of the generation area of the near-field light generated from the near-field light emitting portion of the thermal assist type magnetic head element, which are performed by the probe of the cantilever, and the scanning and measurement of an area distant from the generation area of the near-field light in the height direction, which are performed by the probe of the cantilever, each time the movement of the table unit is reversed.

9. An inspection method for a thermal assist type magnetic head element, the inspection method comprising:
obtaining a writing magnetic field generation area of a thermal assist type magnetic head element by moving a table unit in a plane and detecting a vibration of a cantilever, which includes a probe including a magnetic film and a noble metal film on a surface thereof, while the thermal assist type magnetic head element, which is a specimen, including a magnetic field generating portion and a near-field light emitting portion is placed on the table unit and a writing magnetic field is generated from the magnetic field generating portion of the thermal assist type magnetic head element;
setting a height of the probe of the cantilever from the near-field light emitting portion and a vibration amplitude of the probe to conditions that are required to measure near-field light generated from the near-field light emitting portion while near-field light is generated from the near-field light emitting portion of the thermal assist type magnetic head element, and detecting reflected and scattered light generated from the probe by scanning an area, which includes an area generating the near-field light, by the probe;
inputting a detection signal, which is obtained when the scattered light generated from the probe is detected, to a lock-in amplifier to which a frequency signal allowing the probe to be vibrated with a predetermined period or a signal of an integer multiple of the frequency signal is input as a reference signal, and extracting a scattered light component of the near-field light and a scattered light component of leaking light from the detection signal, which is obtained when the scattered light is detected;
setting the height of the probe of the cantilever from the near-field light emitting portion and the vibration amplitude of the probe to conditions that are required to measure an area higher than an area from which the near-field light is generated while near-field light is generated from the near-field light emitting portion of the thermal assist type magnetic head element, and detecting reflected and scattered light generated from the probe by scanning the area, which is higher than the area from which the near-field light is generated, by the probe;
inputting a signal, which is obtained when the reflected and scattered light generated from the probe is detected, to a lock-in amplifier to which a frequency signal allowing the probe to be vibrated with a predetermined period or a signal of an integer multiple of the frequency signal is input as a reference signal, and extracting a scattered light component of leaking light of the area, which is higher than the area from which the near-field light is generated, from the detection signal that is obtained when the scattered light is detected; and
obtaining a generation area of near-field light of the thermal assist type magnetic head element from information about the scattered light component of the near-field light of the area, from which the extracted near-field light is generated, and a scattered light component of leaking light and information about the scattered light component of leaking light of the area that is higher than the area from which the near-field light is generated.

10. The inspection method for a thermal assist type magnetic head element according to claim 9,
wherein the height of the probe and the vibration amplitude of the probe are switched to a case in which the generation area of the near-field light generated from the near-field light emitting portion of the thermal assist type magnetic head element is scanned and measured by the probe of the cantilever and a case in which an area distant from the generation area of the near-field light in a height direction is scanned and measured by the probe of the cantilever.

11. The inspection method for a thermal assist type magnetic head element according to claim 10,
wherein when the generation area of the near-field light generated from the near-field light emitting portion of the thermal assist type magnetic head element is scanned and measured by the probe of the cantilever, the height of the probe is set to 10 nm or less and the vibration amplitude of the probe is set to 10 nm or less.

12. The inspection method for a thermal assist type magnetic head element according to claim 10,
wherein when an area distant from the generation area of the near-field light in the height direction is scanned and measured by the probe of the cantilever, the height of the probe is set to 100 to 150 nm or more and the vibration amplitude of the probe is set in the range of 50 to 100 nm.

13. The inspection method for a thermal assist type magnetic head element according to claim 9,
wherein when the generation area of the near-field light generated from the near-field light emitting portion of the thermal assist type magnetic head element is scanned and measured by the probe of the cantilever, the height of the probe is set to 10 nm or less and the vibration amplitude of the probe is set to 10 nm or less.

14. The inspection method for a thermal assist type magnetic head element according to claim 9,
wherein when an area distant from the generation area of the near-field light in the height direction is scanned and measured by the probe of the cantilever, the height of the probe is set to 100 to 150 nm or more and the vibration amplitude of the probe is set in the range of 50 to 100 nm.

15. The inspection method for a thermal assist type magnetic head element according to claim 9,
   wherein when the thermal assist type magnetic head element is moved in a plane and the vibration of the cantilever is detected while a magnetic field is generated from the magnetic field generating portion of the thermal assist type magnetic head element and the cantilever is vibrated and when an area distant from the generation area of the near-field light in the height direction is scanned by the probe of the cantilever to measure the leaking light, the height of the probe is set in the range of 20 to 50 nm, the vibration amplitude of the probe is set in the range of 50 to 100 nm, and the measurement of the writing magnetic field generation area and the measurement of the leaking light are simultaneously performed.

16. The inspection method for a thermal assist type magnetic head element according to claim 9,
   wherein the scanning and measurement of the generation area of the near-field light generated from the near-field light emitting portion of the thermal assist type magnetic head element, which are performed by the probe of the cantilever, and the scanning and measurement of an area distant from the generation area of the near-field light in the height direction, which are performed by the probe of the cantilever, are switched whenever the movement of the table unit is reversed.

* * * * *